United States Patent [19]

Childers et al.

[11] 3,846,840

[45] Nov. 5, 1974

[54] READ/WRITE AND LONGITUDINAL EDGE ERASE HEAD ASSEMBLY HAVING MULTIPLE SIMILARLY SHAPED LAYERS

[75] Inventors: William Walter Childers; Karl Heinz Elser, both of San Jose; Phillip John Peterson, Morgan Hill, all of Calif.

[73] Assignee: International Business Machines Corporation, Armonk, N.Y.

[22] Filed: Aug. 10, 1973

[21] Appl. No.: 387,564

[52] U.S. Cl. .................... 360/118, 29/603, 360/121

[51] Int. Cl. .................... G11b 5/26

[58] Field of Search .............. 179/100.2 D, 100.2 C; 340/174.1 F; 346/74 MC; 360/118, 121

[56] References Cited

UNITED STATES PATENTS

| | | | |
|---|---|---|---|
| 3,557,445 | 1/1971 | Mizrahi | 360/118 |
| 3,593,414 | 7/1971 | Beun et al. | 360/118 |

OTHER PUBLICATIONS

"Concurrent Write–Tunnel Erase Element Magnetic Transducers," McWhinney, IBM Tech. Disc. Bul., Vol. 9, No. 7, p. 775, Dec. 1966.

"Integral Transverse Margin Erase Magnetic Recording Head," McClung, IBM Tech. Disc. Bul., Vol. 8, No. 8, p. 1044, Jan. 1966.

"Transverse Erase Magnetic Head," Brede, IBM Tech. Disc. Bul., Vol. 14, No. 4, p. 1282.

*Primary Examiner*—Stanley M. Urynowicz, Jr.
*Assistant Examiner*—Robert S. Tupper
*Attorney, Agent, or Firm*—Nathan N. Kallman; Robert W. Keller

[57] ABSTRACT

A magnetic head assembly for cooperating with a relatively moving magnetic medium and for reading and/or writing one or several tracks of magnetic information and for erasing the edges and old information adjacent the edges of the newly written track after it is written and the method for making the assembly is disclosed. The assembly comprises three similarly shaped layers; a middle layer of substantially constant width including a read/write magnetic core and a first non-magnetic spacer integrally secured thereto, a pair of outer layers secured against the sides of the middle layer in a sandwiched structure, each of the outer layers comprising an erase magnetic core having an end leg portion and a second non-magnetic spacer integrally secured to the erase core, the outer layers aligned similarly with respect to each other and opposite to the middle layer such that the second non-magnetic spacers contact the magnetic read/write core of the first layer, and a single erase coil disposed over respective end legs of the pair of erase cores.

5 Claims, 5 Drawing Figures

READ/WRITE AND LONGITUDINAL EDGE ERASE HEAD ASSEMBLY HAVING MULTIPLE SIMILARLY SHAPED LAYERS

BACKGROUND OF THE INVENTION

1. Field of the Invention

This invention relates to a magnetic transducer with an erase core assembly and, more particularly, a magnetic head assembly having layers that are alternately arranged so as to magnetically isolate the read/write core from the erase cores and the method of manufacturing the assembly.

2. Description of Prior Art

The use of magnetic heads to record and reproduce information has become quite important in recent years. The criticality of improving the magnetic characteristics of such heads has become more pronounced since magnetic recording technology is constantly attempting to improve the areal density of information recorded and reproduced on a magnetic medium. Accordingly, the industry is constantly attempting to improve the track density, which means increasing the number of tracks per inch across the record surface of the magnetic medium. The track density is dependent upon the width of a track of information and thus requires minimizing the effective width of the transducing gap of a magnetic transducer. One method of reduction is to utilize a read/write transducer and to provide erase means for erasing the edges of the written track immediately after it is written. In this manner, a precise narrow track of information will be effectively written. This invention is directed toward a magnetic transducer that is simply constructed from similarly shaped prefabricated layers having an improved longitudinal or sweep erase capability that precisely erases the edges adjacent the newly written track. During operation of the transducer, the erase means are activated at a predetermined time interval relative to the activation of the read/write transducer.

Recording transducers directed toward the concept of erasing tracks of information have long been known in the art. Recording over a track of magnetic information reorients the domains of the magnetic record media and accomplishes an erasure of the information previously recorded on the track. Several examples of techniques and means for providing magnetic erasure are noted: simultaneously erasing a plurality of tracks as shown in U.S. Pat. No. 2,987,582 to Naiman; the concept of tunnel erasing edges of a track by providing tunnel erase means on a magnetic transducer as shown in U.S. Pat. No. 3,155,949 to Tibbets.

Also, U.S. Pat. No. 3,769,469, assigned in common to the same assignee as this application, shows an erase core that is bent so as to position its legs in a spaced apart relationship so as to define erase gaps with respect to a central read/write gap and that provides an erase flux field that is substantially uniform over a range of current. However, the positioning of the erase gaps in this head is difficult to control since the erase core is flexible and is not fixed relative to the width of the read/write gap.

The Naiman patent shows an erase head having a plurality of toothlike pole pieces for selectively erasing a plurality of channels on a magnetic record. The erase bar of this type extends the full width of the record medium and is adapted to be fixed relative thereto. However, this patent does not show erasing the edges of a previously written track and would be inapplicable on accessing systems because of the cumulative tolerance buildup in view of the pole-tip per track arrangement.

The Tibbetts patent describes a tunnel erase magnetic head which includes a read/write element and an erase element for erasing both edges of the path. However, there is no teaching of a simple three-layer magnetic transducer assembly which includes side erase elements that are simply fabricated and do not have to be separately positioned and aligned with respect to the read/write core in a housing.

In order to overcome the above-noted defects a novel magnetic recording transducer having a three layer sandwich structure has been devised. This transducer is assembled from three similarly shaped prefabricated layers. In a preferred embodiment the layered-assembly includes a read/write transducer with a simple erase core assembly, the center layer being of a first constant width and the outer layers being of a second constant width.

Accordingly, it is an object of this invention to provide a simple rugged magnetic recording transducer for use in a magnetic recording system having a simple multiple core assembly with each core magnetically separated from one another.

It is another object to provide a magnetic transducer assembly in which each of the layers comprises a U-shaped magnetic core having a base portion that defines a transducing gap joining a pair of legs and an L-shaped non-magnetic spacer, the base of the L being coplanar with the base of the magnetic core and the leg of the L being in alignment with and secured to one of the legs of the magnetic core, the layers being sandwiched in an alternating pattern such that the magnetic core of the middle layer is juxtaposed by the non-magnetic spacers of the two outer layers.

It is yet another object to provide a method of manufacturing magnetic transducer assemblies comprising the steps of first glass bonding a U-shaped non-magnetic ceramic element to a magnetic ferrite relief, second glass bonding a magnetic ferrite profile to the relief so as to produce a magnetic/ceramic sandwich, slicing the sandwich in a plane perpendicular to the plane of the first glass bond to form a plurality of two-core wafers, slicing each two-core wafer across the first bond to form an integral unit including a magnetic core having a transducing gap and an L-shaped non-magnetic support, assembling an odd-number plurality of the integral units in an alternating pattern such that the core of an internal unit is opposite the cores of adjacent units with the surfaces of the units that include transducing gaps being coplanar, and bonding the assembled units together.

The foregoing and other objects, features and advantages of this invention will be apparent from the following more particular description of the preferred embodiment of the invention as illustrated in the accompanying drawings.

DESCRIPTION OF THE INVENTION

Figures 1, 2, 3, 4, 5:
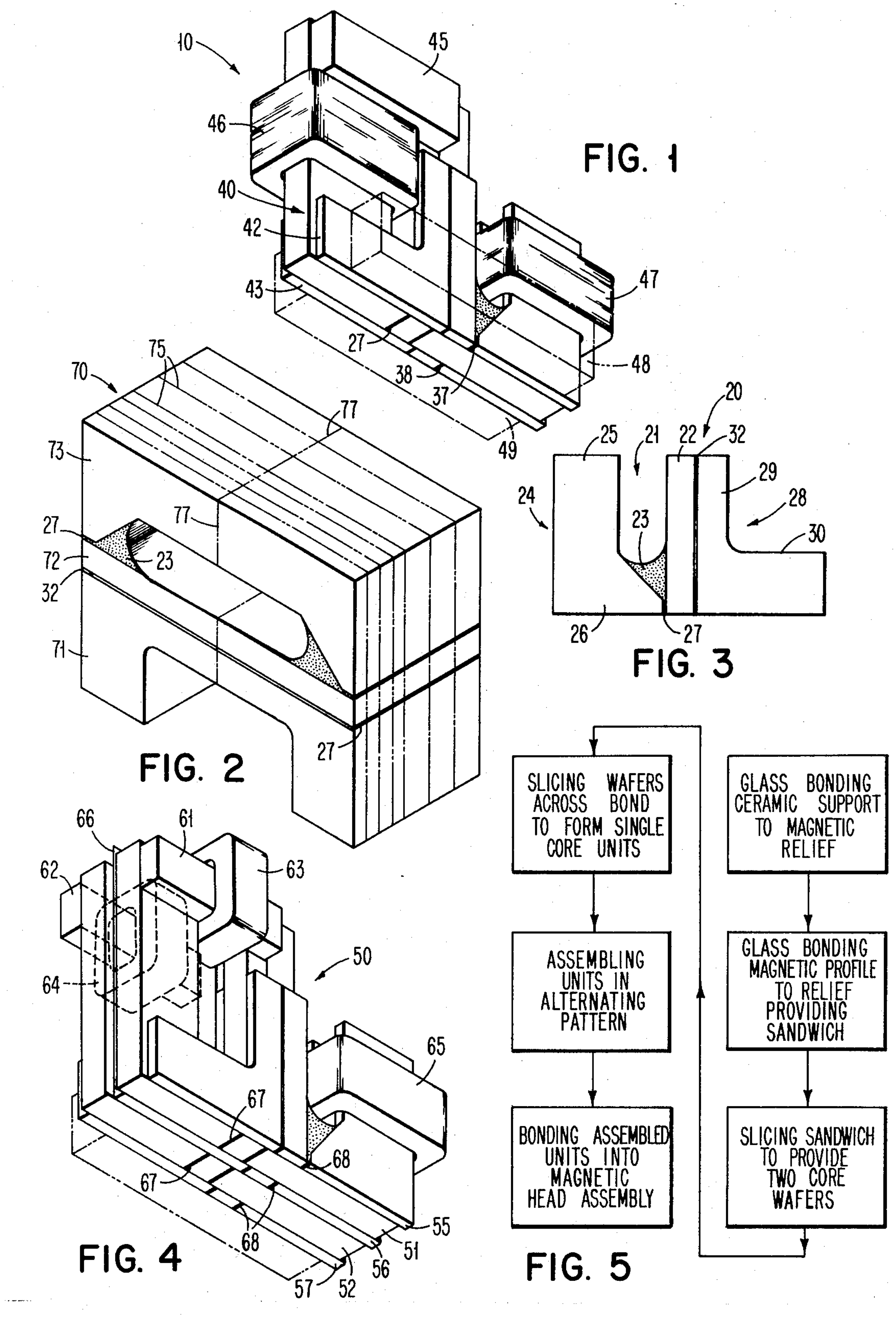
FIG. 1 is a perspective view of the magnetic transducer assembly of this invention comprising the three layers with outrigger portions thereof shown in phantom view.
FIG. 2 is a perspective view of the magnetic/ceramic bonded sandwich assembly having dotted lines illustrating the separate slicing operations that are performed thereon during the fabrication of this magnetic transducer assembly.
FIG. 3 is a side elevation view of one of the finished layers used in this novel magnetic transducer assembly.
FIG. 4 is a perspective view of a multi-element magnetic transducer assembly of this invention having two read/write cores and associated three erase cores.
FIG. 5 is a diagram illustrating the successive steps comprising the novel method of manufacturing the magnetic transducer assembly of this invention.

Referring now to the drawings, and more particularly FIGS. 1 and 3 thereof, there is shown a magnetic transducer assembly, generally designated by the numeral 10 for cooperating with a relatively moving magnetic medium (not shown) for reading and/or writing a track or tracks of magnetic information thereon. The assembly comprises three similarly shaped prefabricated layers, each having a magnetic core portion and a nonmagnetic spacer portion, that are sandwiched together in an alternating pattern such that the magnetic core portion of each of the layers is juxtaposed by the nonmagnetic spacers of the two adjacent layers, thus strengthening the structure and magnetically isolating each magnetic core from the others. The layers have a substantially constant width along their entire length which advantageously allows precise alignment of the outer cores in parallel juxtaposition with the middle core.

In accordance with the preferred embodiment, the magnetic transducer assembly is best suited for reading and/or writing a track of magnetic information and for erasing the edges, and old information adjacent the edges, of the newly written track after it is written. This embodiment is illustrated in FIG. 1 wherein a read/write core layer 40 is centrally disposed between outer erase core layers 42 and 43 with the base surfaces thereof having the read/write transducing gap 27 and the erase transducing gaps 37 and 38, respectively, being coplanar. A read/write coil 46 is disposed around the end leg of the read/write core and a single erase coil 47 is disposed over the end legs of the pair of erase cores 42 and 43. The coils are energized by an appropriate current source which is well known in the art. A sidebar 45 bridges the legs of magnetic core of the middle layer so as to provide a low reluctance flux path through the read/write core. A sidebar is not needed across the legs of the erase cores since sufficient flux is produced across the erase transducing gaps by the erase coil to erase the edges of the read/write track. Non-magnetic outrigger portions 48 and 49 shown in dashed lines are secured to the outer sides of the erase cores 42 and 43 with the bases thereof being coplanar with the base of the transducer assembly. The outriggers protect the erase cores from erosion and increase the bearing surface area, thus assuring a constant erase gap and uniform wear of the head assembly.

Each layer 20 as illustrated in FIG. 3 comprises a U-shaped magnetic ferrite core 21 including a relief portion 22 that is glass bonded 23 to a profile portion 24 so as to define a transducing gap 27 therebetween. An L-shaped nonmagnetic ceramic spacer 28 having an upstanding leg portion 29 and a base portion 30 is secured by a glass bond 32 to the relief 22 of the magnetic core. The spacer 28 is of the same width and in alignment with the magnetic core 21 with the base 30 of the L being coplanar with the base 26 of the magnetic core. The relief portion 22 is I-shaped and comprises one of the legs of the magnetic core. The profile 24 includes the other leg 25 and the base portion 26 of the magnetic core.

In the preferred embodiment, the magnetic core material is an iron nickel zinc ferrite which is readily machinable to a constant width. The glasses 23 and 32 are lead borosilicate glasses having a working temperature of approximately 600°C although similar glass compositions having working temperatures up to 700°C may be used. The spacer 28 and the outriggers 48 and 49 are baria titania ceramic comprising two phases. The first phase is barium titania and the second phase is rutile, being in such proportions that the composite coefficient of thermal expansion of the ceramic is the same as that of the ferrite used in the magnetic cores and the glass bond, and is equal to $90 \times 10^{-7}$ per degree centigrade. Thus, there is no warping between the bonded ferrite-glass-ceramic layer due to temperature changes. The baria titania ceramic consists of less than 20 percent barium oxide, less than 3 percent zirconia, and less than 79 percent titanium dioxide.

The erase head assembly has been found to provide excellent edge erasure when the erase cores have a width of 6 mils and the read/write core is 13 mils. However, this assembly may have erase cores that are equal to or greater than the width of the read/write core in particular applications.

A magnetic head assembly in accordance with this invention can be used solely in the read/write mode without the erase mode of operation. Since the magnetic cores of adjacent layers are magnetically isolated from one another by the ceramic spacers this magnetic head assembly is also useful to provide a plurality of read/write tracks that are virtually adjacent one another. Accordingly, this transducer may be used in track following servo applications such as servoing on its own data tracks where the two outer cores are used to maintain the middle read/write core on a particular track.

In another embodiment a multi-track head assembly generally designated 50, as shown in FIG. 4, comprises two read/write elements, designated as layers 51 and 52 having read/write coils 63 and 64 disposed around sidebars 61 and 62, respectively, associated therewith. Between the read/write core layers are erase core layers 55, 56 and 57 having a common erase coil 65. Shield 66 is disposed between the read/write cores proximate coils 63 and 64 for preventing flux associated with one transducer from linking the other transducer during reading and writing operations. The sidebars are positioned on the outside surfaces of the legs of the two read/write cores to allow room for the shield 66 and the coils. Outrigger elements adjacent the outer layers maintain the dimensional integrity of the outer gaps.

The successive steps in the preferred method of fabricating a magnetic head assembly in accordance with the invention are shown diagrammatically in block diagram form in FIG. 5.

In this preferred method a ferrite brick which has its sides ground to make them relatively smooth is sliced into slabs. These slabs are then machined into an I-shaped relief block 72 and into U-shaped profile block 73, as illustrated in FIG. 2 and into sidebars 45.

A baria titania non-magnetic ceramic brick is also machined smooth, sliced into slabs and ground into the U-shape as illustrated by the numeral 71. Thereafter, glass rods are placed on the ferrite relief and heated to a temperature sufficient to melt the glass thus pre-glassing the relief. The relief portion is then positioned with a small appropriate pressure against the ceramic and heated to the working temperature of glass 32, thus bonding the elements together. Accordingly, the ceramic provides a support for and strengthens the thin brittle ferrite as the surface of the ferrite relief is lapped flat so as to accurately define the transducing gap surface. Similarly, glass 23 is applied to the relief, the profile 73 positioned thereagainst, and the glass heated to its working temperature, thus forming the sandwich, generally illustrated as FIG. 2. Although separate glass bonding steps are described, the bonding of the sandwich may be accomplished in one bonding operation. Alternatively, the glass may also be sprayed onto the relief or sputtered to the desired depth.

After the sandwich cools, the ends of the sandwich are ground and polished so as to accurately define the transducing gap. Then the sandwich is sliced in a plane perpendicular to the first glass bond 32 along the dotted lines 75 with a ganged blade wafering machine into a plurality of two-core wafers. The plurality of wafers are then mounted into a rail fixture and sliced across the glass bond along dotted line 77 to form a plurality of single core units as illustrated in FIG. 3.

Thereafter the desired number of the single-core units or layers are assembled in an alternating pattern, with the magnetic core of one unit opposite the cores of the adjacent units and with the surfaces that include the transducing gaps being coplanar. Because of the accuracy associated with the slicing step 75 the width of the cores are substantially constant along the entire length, thereby enabling adjacent cores to be precisely juxtaposed with one another so that separate alignment steps are not required. Epoxy is applied to the sides of the units so as to bond the assembled units together into an integral assembly.

This proces is used to fabricate several magnetic head assemblies, each of which has an odd number of layers. The single track read/write head has a middle layer that is wider than the outer erase layers. The two track head has five alternating read/write core layers and erase core layers with a magnetic shield 66 disposed on the center spacer between the read/write cores.

Outriggers are bonded to the respective outside surfaces of the outer core layers to protect the outermost transducing gap, the bottom surfaces of all elements of the structure being substantially coplanar. The read/write coil 46 is placed over the outer leg 25 of the ferrite read/write core such that it rests on and is supported by the outrigger. A single erase coil 47 is positioned over all the legs of the erase cores. Finally the ferrite sidebar 45 is bonded to the uppermost portions of one side of the ferrite read/write core, so as to provide a low reluctance flux path around the read/write core.

From the foregoing, it has been shown that this invention provides a simple and novel magnetic recording head that is formed from an odd number of similarly shaped prefabricated layers. While there has been described, what are at present. considered to be the preferred embodiments of the magnetic transducer assemblies in accordance with this invention, it will be understood that various modifications may be made therein, and it is intended to cover in the appended claims all such modifications as fall within the true spirit and scope of the invention.

What is claimed is:

1. A magnetic head assembly for recording or reading data and for erasing edge portions of newly-recorded data and previously recorded data comprising:

at least one group of three like layers joined in a sandwich structure for recording or reading and erasing data associated with a single data track, the center layer being a read-write layer, and the outer layers being erase layers, the center layer facing in a direction opposite to the outer layers;

each layer having a magnetic core portion having a transducing gap said magnetic core portion having two legs separated by said transducing gap, said gap being formed by a nonmagnetic spacer portion joined to one leg of said core, and the axes of said gaps being parallel;

a sidebar bridging the legs of said core portion of said center layer to form a closed magnetic path about said gap;

a first electrical conducting coil disposed about an end leg of the core of said center read-write layer; and a second electrical conducting coil disposed about the end legs of the cores of the outer erase layers;

each layer having a nonmagnetic portion joined to on one leg of said magnetic core portion, said outer erase layers aligned similarly with respect to each other and opposite to said center read-write layer such that only the nonmagnetic portions contact the magnetic core portion of said center read-write layer.

2. The magnetic head assembly of claim 1, wherein the width of said middle layer is substantially constant.

3. The magnetic head assembly of claim 1, wherein said assembly comprises five layers, the outer and middle layers comprising erase elements and the second and fourth layers comprising read/write elements, and further comprising shield means disposed between said pair of read/write elements for magnetically shielding each read/write element from the other.

4. A magnetic head assembly for cooperating with a relatively moving magnetic medium for reading and/or writing a track of magnetic information and for erasing the edges of the newly written track immediately after it is written, said assembly comprising:

a middle layer of substantially constant width including a read/write magnetic core having a transducing gap and a first non-magnetic spacer integrally secured to said core;

a pair of outer layers secured against the sides of said middle layer in a sandwich structure, each of said outer layers comprising an erase magnetic core portion having an erase gap, said erase magnetic core portion having inner and outer leg portions separated by said erase gap, and a second non-magnetic spacer integrally secured to said inner leg portion said outer layers aligned similarly with respect to each other and opposite to said middle layer such that only the second non-magnetic spacers contact the magnetic read/write core of said first layer, and the axis of said transducing gap being parallel to the axes of said erase gaps;

a read/write coil disposed over said read/write magnetic core; and a single erase coil disposed over respective outer legs of the pair of erase cores.

5. A magnetic head assembly for cooperating with a relatively moving magnetic medium comprising:

a middle layer comprising a magnetic ferrite read/-write core having a read/write transducing gap, said read/write core having two leg members separated by said gap, and a first L-shaped non-magnetic spacer aligned joined to said core, the upstanding leg portion of the L secured to one of said read/write leg members and the base portion of the L being coplanar with said transducing gap, said middle layer having a substantially constant width;

a magnetic sidebar disposed against both leg members of said read/write core so as to form a magnetic circuit therethrough;

a read/write coil disposed about said read/write core, thus providing a read/write magnetic transducer;

a pair of outer layers, each outer layer including a magnetic ferrite erase core having an erase gap, said erase core having two leg members separated by said erase gap, and a second L-shaped non-magnetic spacer secured against and in alignment with one of said leg members of said erase core, said outer layers in juxtaposition against the sides of said middle layer such that only the second non-magnetic spacers contact said read/write core, said pair of outer layers having substantially the same width, the axis of said transducing gap being parallel to the axes of said erase gaps; and an erase coil disposed over the other legs of said pair of erase cores, whereby said erase gaps of the erase cores sweep the edges of a track of information written by said read/write transducer immediately after said track is written.

* * * * *

PO-1050
(5/69)

UNITED STATES PATENT OFFICE
CERTIFICATE OF CORRECTION

Patent No. 3,846,840 Dated November 5, 1974

Inventor(s) William Walter Childers et al

It is certified that error appears in the above-identified patent and that said Letters Patent are hereby corrected as shown below:

In Col. 6, line 32 at the end thereof, omit "on".

Signed and sealed this 18th day of March 1975.

(SEAL)
Attest:

RUTH C. MASON
Attesting Officer

C. MARSHALL DANN
Commissioner of Patents
and Trademarks